United States Patent [19]

Markyvech et al.

[11] Patent Number: 4,991,099
[45] Date of Patent: Feb. 5, 1991

[54] CONTROL SYSTEM/METHOD FOR CONTROLLING SHIFTING OF A RANGE TYPE COMPOUND TRANSMISSION USING INPUT SHAFT AND MAINSHAFT SPEED SENSORS

[75] Inventors: Ronald K. Markyvech, Allen Park; Thomas A. Genise, Dearborn, both of Mich.

[73] Assignee: Eaton Corporation, Cleveland, Ohio

[21] Appl. No.: 368,500

[22] Filed: Jun. 19, 1989

[51] Int. Cl.⁵ .................... B06K 41/08; G06F 15/20
[52] U.S. Cl. .................... 364/424.1; 364/431.1; 74/866
[58] Field of Search ............ 364/424.1, 431.1; 74/866, 867; 192/0.052, 0.090

[56] References Cited

U.S. PATENT DOCUMENTS

| | | | |
|---|---|---|---|
| 4,425,620 | 1/1984 | Batcheller et al. | 364/424.1 |
| 4,631,679 | 12/1986 | Klatt | 364/424.1 |
| 4,648,290 | 3/1987 | Dunkley et al. | 74/866 |
| 4,740,898 | 4/1988 | McKee et al. | 364/431.01 |
| 4,849,888 | 7/1989 | Seto | 364/424.1 |

Primary Examiner—Parshotam S. Lall
Assistant Examiner—Tyrone Queen
Attorney, Agent, or Firm—H. D. Gordon

[57] ABSTRACT

A control system/method for controlling the automatic or semi-automatic shifting of a range type compound transmission (10) is provided. The control utilizes a processing unit (106) requiring only two speed inputs, indicative of input shaft (16) and mainshaft (28) rotational speeds, to command both simple and compound shifts and to confirm the execution thereof.

9 Claims, 4 Drawing Sheets

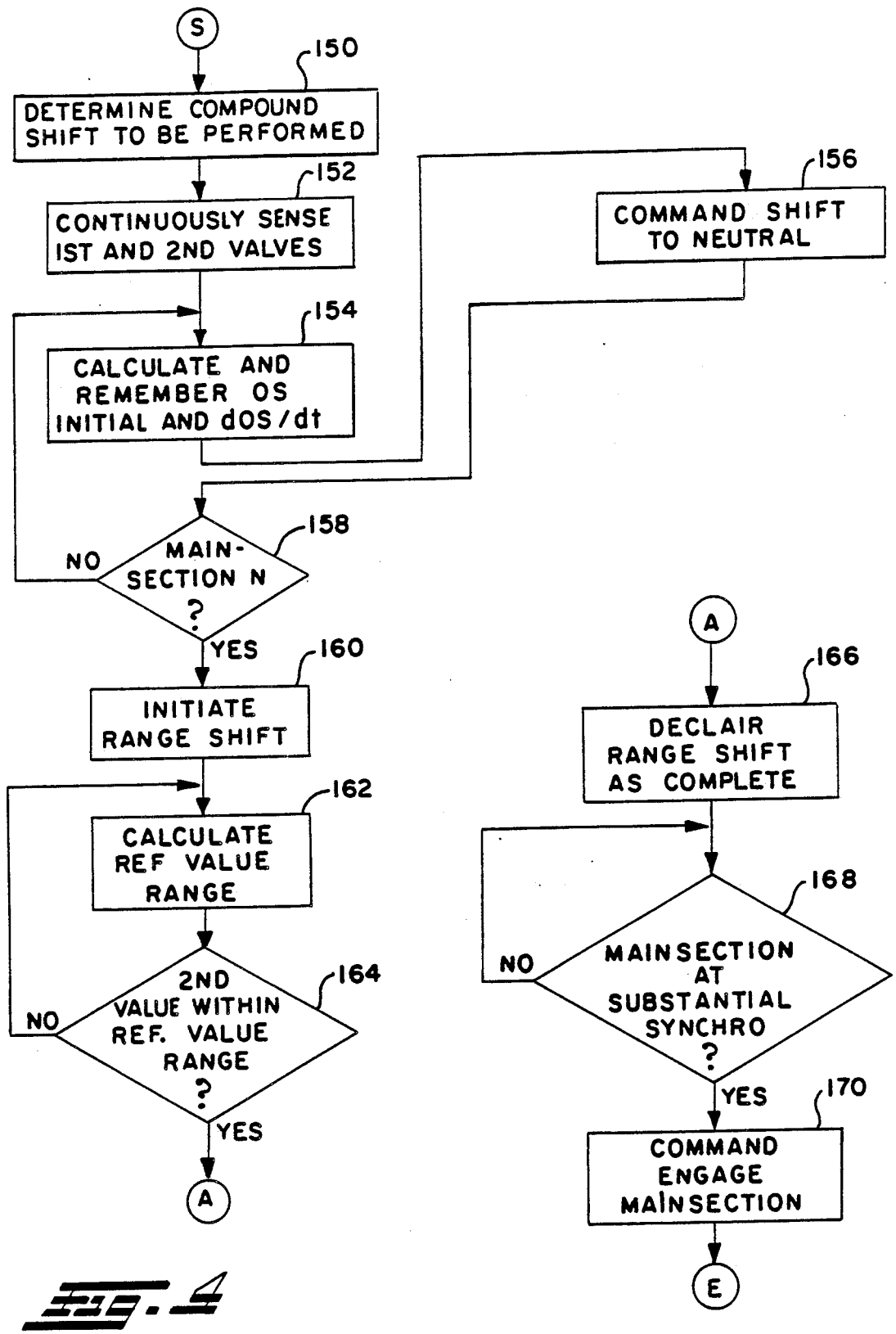

CONTROL SYSTEM/METHOD FOR CONTROLLING SHIFTING OF A RANGE TYPE COMPOUND TRANSMISSION USING INPUT SHAFT AND MAINSHAFT SPEED SENSORS

RELATED APPLICATIONS

This Application is related to U.S. Applications Ser. No. 368,011, titled SEMI-AUTOMATIC SHIFT IMPLEMENTATION FOR MECHANICAL TRANSMISSION SYSTEM; Ser. No. 368,502, titled CONTROL SYSTEM AND METHOD FOR SENSING AND INDICATING NEUTRAL IN A SEMI-AUTOMATIC MECHANICAL TRANSMISSION SYSTEM; Ser. No. 368,492, titled ENHANCED MISSED SHIFT RECOVERY FOR SEMI-AUTOMATIC SHIFT IMPLEMENTATION CONTROL SYSTEM; and Ser. No. 368,467, titled AUTOMATIC SHIFT PRESELECTION MODE FOR MECHANICAL TRANSMISSION SYSTEM WITH SEMI-AUTOMATIC SHIFT IMPLEMENTATION; all assigned to Eaton Corporation, the assignee of this Application, and all filed the same day as this Application.

BACKGROUND OF THE INVENTION

1. Field of the Invention

This invention relates to vehicular automatic and semi-automatic mechanical transmission systems and, in particular, to mechanical transmission systems of the type providing at least partially automatic implementation of selected changes or shifting of compound range type transmission gear ratios. More particularly, the present invention relates to a control system for controlling the shifting of mechanical range type compound transmission requiring only speed inputs indicative of input shaft and mainshaft rotational speeds.

2. Description of the Prior Art

Fully automatic transmission systems, both for heavy-duty vehicles such as heavy-duty trucks, and for automobiles, that sense throttle openings or positions, vehicle speeds, engine speeds, and the like, and automatically shift the vehicle transmission in accordance therewith, are well known in the prior art. Such fully automatic change gear transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065 and 4,361,060, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof.

Semi-automatic transmission systems utilizing electronic control units which sense throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior art. Examples of such semi-automatic transmission systems may be seen by reference to U.S. Pat. Nos. 4,425,620; 4,631,679 and 4,648,290, the disclosures of which are incorporated herein by reference.

While such semi-automatic mechanical transmission systems are very well received as they are somewhat less expensive than fully automatic transmission systems, allow manual clutch control for low speed operation and/or do not require automatic selection of the operating gear ratio, they may be too expensive for certain applications as a relatively large number of sensors and automatically controllable actuators, such as a master clutch and/or a fuel throttle device actuator, are required to be provided, installed and maintained.

Systems for automatic control of compound mechanical transmissions utilizing speed signals from the input shaft and the output shaft are known, as may be seen by reference to U.S. Pat. No. 4,722,248, the disclosure of which is hereby incorporated by reference. Such control systems may be less than satisfactory as the output shaft speed sensor is often in an exposed location, subjecting same to potential tampering and/or damage and/or during a compound shift, with the mainsection in neutral, the input and output shafts are not related in a known manner and thus completion of the auxiliary range shift cannot be confirmed by processing signals indicative of input and output shaft speeds.

SUMMARY OF THE INVENTION

In accordance with the present invention, the drawbacks of the prior art are overcome or minimized by the provision of a control system/method such as a semi-automatic shift implementation system/method for a mechanical range type transmission system for use in vehicles having a manually only controlled engine throttle means, and a manually only controlled master clutch. The system includes a control/display panel or console for operator selection of upshifts, downshifts or shifts into neutral, an electronic control unit (ECU) for receiving input signals indicative of transmission input and main shaft speeds and of selected shifts and for processing same in accordance with predetermined logic rules to issue command output signals and a transmission actuator for shifting the transmission in accordance with the command output signals.

The control/display device will allow the operator to select/preselect a shift into a higher ratio, a lower ratio or into neutral and will display the selected but not yet implemented shift as well as the current status of the transmission.

Accordingly, a control system/method for a vehicular automatic or semi-automatic mechanical range type compound transmission system for at least partially automatic implementation of selected transmission shifts is provided which does not require throttle or clutch actuators, and which requires only two speed signal inputs, input shaft and mainshaft, is provided.

By utilizing a control system/method requiring speed inputs from only an input shaft speed sensor and a mainshaft speed sensor, only two speed sensors are required, the required speed sensors may be provided at relatively well protected locations and the signals may be processed by predetermined logic rules to verify the implementation of both auxiliary and main section shifts.

This and other objects and advantages of the present invention will become apparent from a reading of the detailed description of the preferred embodiment taken in connection with the attached drawings.

BRIEF DESCRIPTION OF THE DRAWINGS

FIGS. 4A and 4B are a schematic illustration, in flow chart format, of the control system/method of the present invention.

DESCRIPTION OF THE PREFERRED EMBODIMENT

Figure 1:
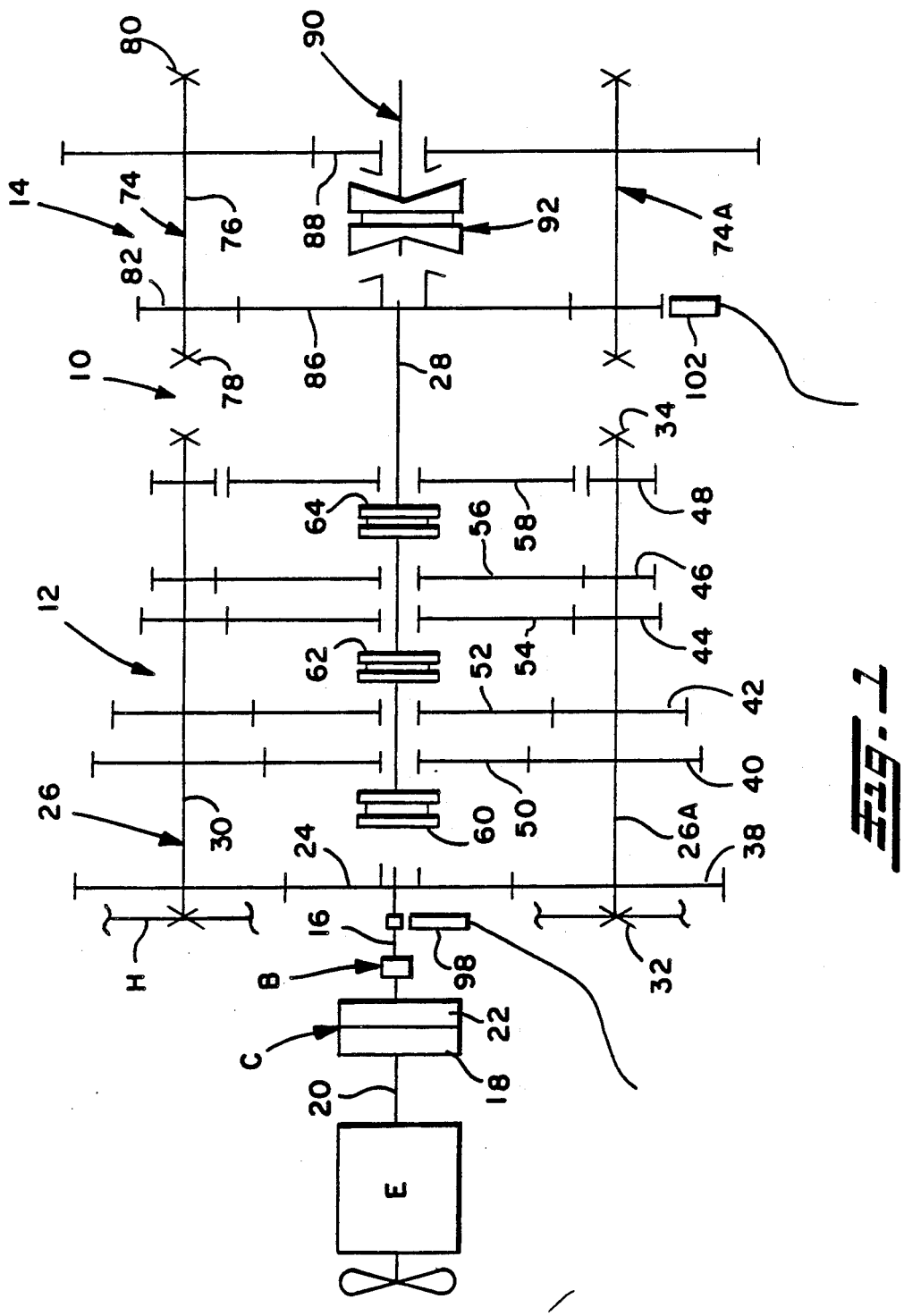
FIG. 1 is a schematic illustration of a vehicular compound range type mechanical transmission system partially automated by a system utilizing the control system/method of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate and substantially synchronous speed.

Compound transmissions of the range, splitter and combined range and splitter type are well known in the prior art as may be seen by reference to U.S. Pat. No. 4,754,665, the disclosure of which is hereby incorporated by reference.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio.

Referring to FIG. 1, a range type compound transmission 10 of the type partially automated by a semiautomatic mechanical transmission system of the type advantageously utilizing the control system/method of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually controlled throttle device (not shown) and the master clutch C is manually controlled by a clutch pedal (not shown) or the like. An input shaft brake B, operated by the clutch pedal, is preferably provided to provide quicker upshifting as is well known in the prior art.

Transmissions similar to mechanical transmission 10 are well known in the prior art and may be appreciated by reference to U.S. Pat. Nos. 3,105,395; 3,283,613 and 4,754,665, the disclosures of which are incorporated by reference.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

Figure 1A:
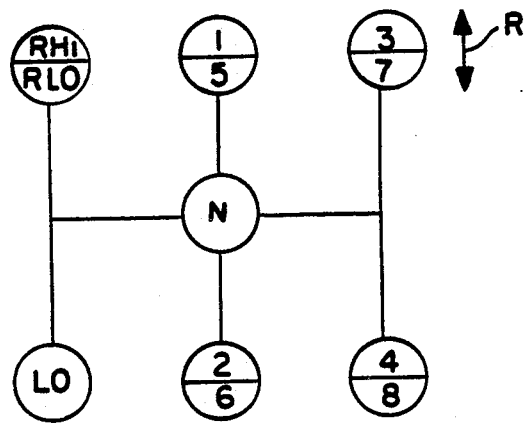
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershaft type.

For purposes of providing semi-automatic shift implementation operation of transmission 10, an input shaft speed sensor and a sensor 102 for sensing the rotational speed of auxiliary section countershaft gear 82 may be utilized. The rotational speed of gear 82 is, of course, a known function of the rotational speed of mainshaft 28 and, if clutch 92 is confirmed to be engaged in a known position, a known function of the rotational speed of output shaft 90.

Figure 2:
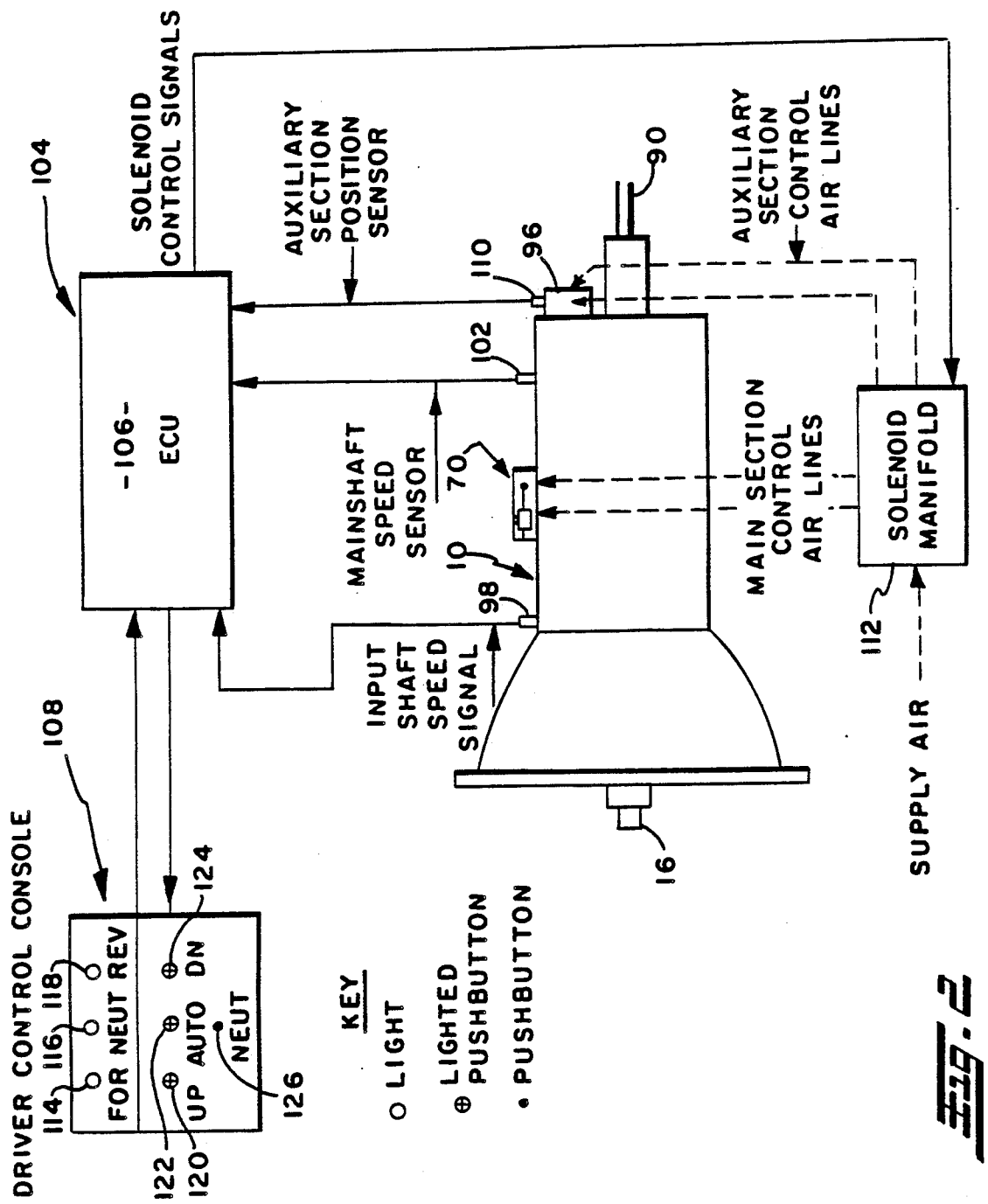
FIG. 2 is a schematic illustration of a semi-automatic shift implementation system for a range type mechanical transmission system utilizing the control system/method of the present invention.

The semi-automatic shift implementation control system 104 utilizing the control system of the present invention is schematically illustrated in FIG. 2. Control system 104, in addition to the range type mechanical transmission system 10 described above, includes an electronic control unit 106, preferably microprocessor based, for receiving input signals from the input shaft speed sensor 98, from the mainshaft speed sensor 102) and from the driver control console 108. The ECU 106 may also receive inputs from an auxiliary section position sensor 110.

The ECU is effective to process the inputs in accordance with predetermined logic rules to issue command output signals to a transmission operator, such as solenoid manifold 112 which controls the mainsection section actuator 70 and the auxiliary section actuator 96, and to the driver control counsel 108.

The driver control counsel allows the operator to manually select a shift in a given direction or to neutral from the currently engaged ratio, or to select a semiautomatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection made by depressing or pushing any one of buttons 120, 122, 124 or 126 and may be cancelled (prior to execution in the case of buttons 120, 124 and 126) by redepressing the buttons. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

To implement a selected shift, the manifold 112 is preselected to cause actuator 70 to be biased to shift main transmission section 12 into neutral. This is accomplished by the operator causing a torque break by manually momentarily decreasing and/or increasing the supply of fuel t the engine and/or manually disengaging the master clutch C. As the transmission is shifted into neutral, and neutral is verified by the ECU, the neutral condition indicia button 116 is lighted. If the selected shift is a compound shift, i.e. a shift of both the main section 12 and of the range section 14, such as a shift from 4th to 5th speeds as seen in FIG. 1A, the ECU will issue command output signals to manifold 112 to cause the auxiliary section actuator 96 to complete the range shift.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As indicated above, when the auxiliary section is engaged in a known ratio, the signal from sensor 1022 will be a signal indicative of output shaft speed. As the operator, by throttle manipulation and/or use of the input shaft brake, causes the input shaft speed to fall within the acceptable range, the ECU 106 will issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the automatic preselection mode of operation, selected by use of lighted pushbutton 122, the ECU will, based upon stored logic rules, currently engaged ratio (which may be calculated by comparing input shaft to output shaft speed) and output shaft speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash. The operator may initiate semi-automatic implementation of the automatically preselected shift as indicated above or may cancel the automatic mode by depression of pushbutton 122.

As an alternative, the neutral condition indication light 116 may be eliminated and neutral selection pushbutton 126 replaced by a lighted pushbutton.

A flow chart representation of the control method/system of the present invention may be seen by reference to FIGS. 4A and 4B.

Upon a determination that a compound shift of transmission 10 is required, the EPU will continue to sense the input signals from the input shaft and the mainshaft speed sensors, see operation blocks 150 and 152.

EPU 106 will process these values, as shown at operation block 154, to calculate and store an initial output shaft speed (OS initial) and a rate of change of output shaft speed (dOS/dt). As shown at operation 156, a command for a shift to neutral is issued, and a test for confirmed neutral occurs as at decision block 158. Main section neutral may be confirmed by comparing the first signal to the second signal and/or the rate of change of the first signal relative to the second signal to predetermined reference values.

Upon confirmation of a main section neutral condition, the EPU will command a range shift to be executed, see operation block 160. The EPU will then, operation block 162, calculate or otherwise determine a range of reference values which correspond to the expected value of the second signal as the auxiliary section shift is completed. Briefly, based upon the initial output shaft (i.e. vehicle) speed, (OS initial), the rate of change in output shaft speed (dOS/dt) and the auxiliary ratio to be engaged, a range of expected mainshaft speeds, and corresponding second signal values, may be calculated. The sensed second value is then, at decision block 164 compared to the reference range to determine if completion of the range auxiliary is confirmed, operation block 166. Upon confirmation of the auxiliary shift execution, the main section is engaged by sensing for substantial mainsection synchronization, decision block 168, and, upon achieving such substantial synchronization, commanding an engagement of the main section in the appropriate ratio, operation block 170.

The auxiliary section actuator 96 may be provided with position sensing means 110 for providing an auxiliary section position signal to the ECU 106 which is useful during power interruptions or the like to inform the ECU of the probable engaged ratio of the auxiliary section at return of power.

Figure 3:
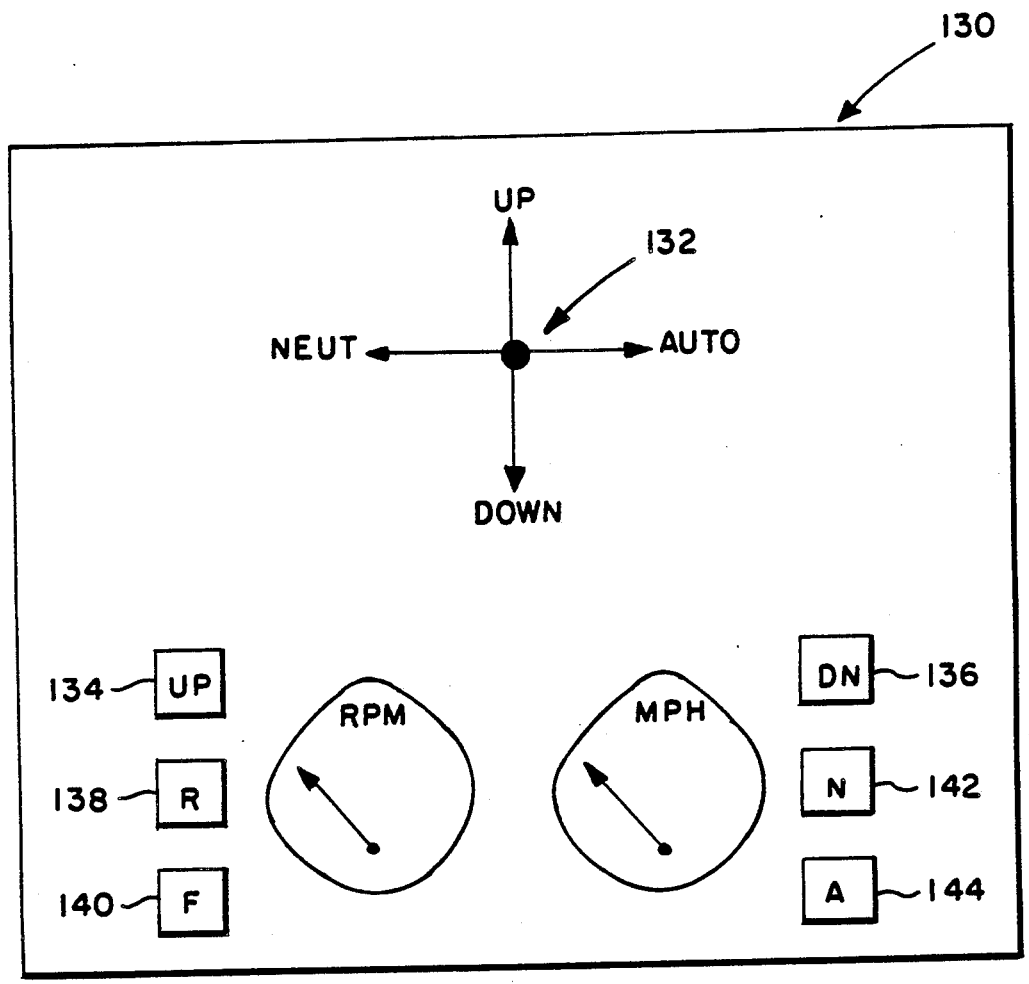
FIG. 3 is a schematic illustration of an alternate control console for the system of FIG. 2.

An alternate driver control and display console 130 may be seen by reference to FIG. 3. A joy stick 132 is movable against a resilient bias from its centered position to select upshifts, downshifts, a shift to neutral or the automatic preselect mode by movement up, down, leftward or rightward, respectively, as indicated. Indicia lights 134 and 136 are lighted to indicate an upshift or downshift, respectively, is preselected. Indicia lights 138 and 140, respectively, are lighted to indicate a vehicle forward or reverse, respectively, mode of operation. Indicia light 142 is steadily lighted to indicate a transmission neutral condition and is flashed to indicate a preselected but not yet confirmed neutral condition. Indicia light 144 is lighted to indicate system 104 is operating in the automatic preselection mode of operation.

Accordingly, it may be seen that a relatively simple and inexpensive semi-automatic shift implementation control system (104)/method for a mechanical transmission system 10 requiring only a transmission shift actuator (112/70/96) and two speed inputs, inputs indicative of input shaft and of main shaft rotational speed, to be added to vehicle mechanical transmission system is provided. An electronic control unit 106 for receiving the two speed inputs, and inputs from an operator's console and for issuing command outsignals to the actuators and to the display portion of the operator's console is also provided. In the illustrated system, semi-automatic execution of manually or automatically preselected shifts requiring the operator to (i) cause a torque break for disengaging the currently engaged ratio and (ii) to cause substantially synchronous rotation for engagement of the selected ratio, is provided which allows the system to operate without requiring automatically operated throttle controls or master clutch actuators.

Although the present invention has been described with a certain degree of particularity, it is understood that various changes to form and detail may be made without departing from the spirit and the scope of the invention as hereinafter claimed.

We claim:

1. A control system for controlling the shifting of a compound transmission (10) comprising the multiple speed main transmission section (12) connected in series with a multiple speed auxiliary transmission section (14), said main transmission section having a selectable neutral position and said auxiliary transmission section shiftable to a selected one of said multiple auxiliary section ratios, said transmission comprising an input component comprising an input shaft, an input gear (24) adapted to be rotationally fixed to said input shaft, at least one countershaft (26) carrying a plurality of countershaft gears (40,42,44,46) thereon, one of said countershaft gears constantly meshed with said input gear and a plurality of mainshaft gears (50,52,54,65) constantly meshed with other of said countershaft gears; a connection component comprising a mainshaft (28) and a plurality of first mainshaft clutch members (60,62,64) and a second mainshaft clutch member (92) rotationally fixed to said mainshaft, said connecting component independently rotatable of said input component; and an output component comprising an output shaft, said output component independently rotatable of said connection component; said mainshaft gears selectively clutchable one at a time to said mainshaft by first clutch means including said first clutch members; said output component drivingly engageable and disengageable to said mainshaft by second clutch means including said second mainshaft clutch member; said control system comprising:

a first sensor (98) for providing a first input signal indicative of transmission input shaft (16) rotational speed, a second sensor (102) for providing a second input signal continuously indicative of mainshaft (26) rotational speed and a controllable transmission actuator (112, 70, 96) for controlling shifting of the transmission, said control system characterized by;

means (120, 124/132) for selecting an upshift or a downshift from a currently engaged transmission ratio or from neutral to a selected ratio, and providing a third input signal indicative of said selection; and a central processing unit (106) for receiving said first, second and third input signals and for processing the same in accordance with predetermined logic rules to issue command output signals, said central processing unit including means to determine and store the initial speed (OS initial) and rate of change of speed (dOS/dt) of the output shaft (90) as functions of the engaged auxiliary section ratio and the value of the second input signal.

2. A control system for controlling the shifting of a compound transmission (10) comprising a multiple speed main transmission section (12) connected in series with a multiple speed auxiliary transmission section (14), said main transmission section having a selectable neutral position and said auxiliary transmission section shiftable to a selected one of said multiple auxiliary section ratios, said transmission comprising an input component comprising an input shaft, an input gear (24) adapted to be rotationally fixed to said input shaft, at least one countershaft (26) carrying a plurality of countershaft gears (40,42,44,46) thereon, one of said countershaft gears constantly meshed with said input gear and a plurality of mainshaft gears (50, 52,54,56) constantly meshed with other of said countershaft gears; a connection component comprising a mainshaft (28) and a plurality of first mainshaft clutch members (60,62,64) and a second mainshaft clutch member (92) rotationally fixed to said mainshaft, said connecting component independently rotatable of said input component; and an output component comprising an output shaft, said output component independently rotatable of said connection component; said mainshaft gears selectively clutchable one at a time to said mainshaft by first clutch means including said first clutch members; said output component drivingly engageable and disengageable to said mainshaft by second clutch means including said second mainshaft clutch members; said control system comprising:

a first sensor (98) for providing a first input signal indicative of transmission input shaft (16) rotational speed, a second sensor (102) for providing a second input signal continuously indicative of mainshaft (26) rotational speed and a controllable transmission actuator (112, 70, 96) for controlling shifting of the transmission, said control system characterized by;

means (120, 124/132) for selecting an upshift or a downshift from a currently engaged transmission ratio or from neutral to a selected ratio, and providing a third input signal indicative of said selection; and a central processing unit (106) for receiving said first, second and third input signals and for processing the same in accordance with predetermined logic rules to issue command output signals, said central processing unit including:

(a) means responsive to selection of a compound transmission shift for issuing command output signals to said actuator to bias the transmission mainsection to be shifted into neutral; and (b) means to determine and store the initial speed (OS initial) and rate of change of speed (dOS/dt) of the output shaft (90) as functions of the engaged auxiliary section ratio and the value of the second input signal;

(c) means responsive to a confirmation of mainsection neutral to command an auxiliary section shift;

(d) means to calculate a range of reference values corresponding to values of said second input signal at the expected speed of said mainshaft at completion of the auxiliary section shift determined as a function of (i) the ration of the auxiliary speed to be engaged, (ii) the initial speed of the output shaft and (iii) the rate of change of output shaft speed; and (e) means to compare said second input signal to said reference range and to confirm execution of said commanded auxiliary section shift when said second input signal falls within the upper and lower limits of said reference range.

3. The system of claim 2 wherein said central processing unit additionally includes:

(f) means responsive to confirmation of an executed auxiliary section shift for (i) sensing substantial synchronization of the transmission and (ii) thereafter for issuing command output signals to said actuator to cause the transmission to be shifted into the selected main section ratio.

4. A control method for controlling the shifting of a compound range type mechanical transmission (10) comprising a multiple speed main transmission section (12) connected in series with a multiple speed auxiliary transmission section (14), said main transmission section having a selectable neutral position and said auxiliary transmission section shiftable to a selected one of said multiple auxiliary section ratios, said transmission comprising an input component comprising an input shaft, an input gear (24) adapted to be rotationally fixed to said input shaft, at least one countershaft (26) carrying a plurality of countershaft gears (40,42,44,46) thereon, one of said countershaft gears constantly meshed with said input gear and a plurality of mainshaft gears (50,52,54,56) constantly meshed with other of said countershaft gears; a connection component comprising a mainshaft (28) and a plurality of first mainshaft clutch members (60,62,64) and a second mainshaft clutch member (92) rotationally fixed to said mainshaft, said connecting component independently rotatable of said input component; and an output component comprising an output shaft, said output component independently rotatable of said connection component; said mainshaft gears selectively clutchable one at a time to said mainshaft by first clutch means including said first clutch members; said output component drivingly engageable and disengageable to said mainshaft by second clutch means including said second clutch member; said control method comprising:

providing a first sensor (98) for providing a first input signal indicative of transmission input shaft (16) rotational speed; a second sensor (102) for providing a second input signal continuously indicative of mainshaft (28) rotational speed; and a non-manually controllable transmission actuator (112, 70, 96) for controlling shifting of the transmission;

providing means (120, 124/132) for selecting an upshift or a downshift from a currently engaged transmission ratio or from neutral to a selected ratio, and providing a third input signal indicative of said selection; and providing a central processing unit (106) for receiving said first, second and third input signals and for processing same in accordance with predetermined logic rules to issue command output signals, said logic rules including the steps of:

(a) responding to selection of a compound transmission shift by issuing command output signals to said actuator to bias the transmission mainsection to be shifted into neutral;

(b) determining and storing the initial speed (OS initial) and rate of change of speed dOS/dt of the output shaft (90); as functions of the engaged auxiliary section ratio and the value of the second input signal;

(c) responding to a confirmation of mainsection neutral by commanding an auxiliary section shift;

(d) calculating a range of reference values corresponding to values of said second input signal at the expected speed of said mainshaft at completion of the commanded auxiliary section shift determined as a function of (i) the ratio of the auxiliary speed to be engaged, (ii) the initial speed of the output shaft and (iii) the rate of change of output shaft speed; and (e) comparing said second input speed reference range and confirming execution of said commanded auxiliary section shift when said second input signal falls within the upper and lower limits of said reference range.

5. The control method of claim 4 wherein said central method additionally includes:

(f) responding to confirmation of an executed transmission section shift by (i) sensing auxiliary substantial synchronization of the transmission and (ii) thereafter issuing command output signals to said actuator to cause the transmission to be shifted into the selected main section ratio.

6. A control system (104) for semi-automatic implementation of selected shifts of a mechanical change gear transmission system comprising a manually controlled fuel throttle controlled engine (E), a multi-speed range type compound change gear mechanical transmission (10), comprising: an input component comprising an input shaft, an input gear adapted to be rotationally fixed to said input shaft, at least one countershaft carrying a plurality of countershaft gears thereon, one of said countershaft gears constantly meshed with said input gear and a plurality of mainshaft gears constantly meshed with other of said countershaft gears; a connection component comprising a mainshaft and a plurality of first mainshaft clutch members and a second mainshaft clutch member rotationally fixed to said mainshaft, said connecting component independently rotatable of said input component; and an output component comprising an output shaft, said output component independently rotatable of said connection component; said mainshaft gears selectively clutchable one at a time to said mainshaft by first clutch means including said first clutch members; said output component drivingly engageable and disengageable to said mainshaft by second clutch means including said second clutch member;

a manually controlled master friction clutch (C) drivingly interposed between the engine and the transmission, a first sensor (98) for providing a first input signal indicative of transmission input shaft (16) rotational speed, a second sensor (102) for providing a second input signal indicative of the mainshaft (28) rotational speed and a non-manually controllable transmission actuator (112,70,96) for controlling shifting of the transmission, said control system characterized by;

means (120, 124/132) for selecting an upshift or a downshift from a currently engaged transmission ratio or from neutral to a selected ratio, and providing a third input signal indicative of said selection;

a central processing unit (106) for receiving said first, second and third input signals and for processing same in accordance with predetermined logic rules to issue command output signals, said central processing unit including:

(a) means responsive to selection of a transmission shift from a currently engaged ratio for issuing command output signals to said actuator to bias the transmission mainsection to be shifted into neutral;

(b) means responsive to (i) a selection of a simple shift from a currently engaged ratio into a selected ratio and (ii) confirmation of a transmission main section neutral condition for 9i) sensing manual substantial synchronization of the transmission and (ii) thereafter for issuing command output signals to said actuator to cause the transmission to be shifted into the selected ratio; and (c) means responsive to (i) a selection of a compound shift from a currently engaged ratio and (ii) confirmation of a transmission main section neutral condition for (i) determining and storing the initial speed (OS initial) and rate of change of speed (dOS/dt) of the output shaft (90) as functions of the engaged auxiliary section ratio and the value of the second input signal; (11) for responding to a confirmation of mainsection neutral to command an auxiliary section shift (iii) for calculating a range of reference values corresponding to values of said second input signal at the expected speed of said mainshaft at completion of the commanded auxiliary section shift determined as a function of (i) the ratio of the auxiliary speed to be engaged, (ii) the initial speed of the output shift and (iii) the rate of change of output shaft speed; and (iv) for comparing said sound input speed reference range and to confirm execution of said commanded auxiliary section shift when said second input signal falls within the upper and lower limits of said reference range.

7. The system of claim 6 wherein said central processing unit additionally includes:
(f) means responsive to confirmation of an executed auxiliary transmission section shift for (i) sensing substantial synchronization of the transmission and (ii) thereafter for issuing command output signals to said actuator to cause the transmission to be shifted into the selected main section ratio.

8. The control system of claim 7 wherein said means for sensing main section synchronization comprises means for determining a reference range of acceptable values of said first signal as a function of said second signal and means for comparing the current value of said first signal to said range of reference values.

9. The control system of claim 7 additionally including indicia means (120, 124, 114/134, 136, 142) for indicating selection but not confirmed execution of a shift from the currently engaged transmission ratio.

* * * * *